(12) United States Patent
Natarahjan et al.

(10) Patent No.: US 9,225,509 B2
(45) Date of Patent: Dec. 29, 2015

(54) METHOD AND APPARATUS FOR ACHIEVING SYNCHRONIZATION IN A WIRELESS COMMUNICATION SYSTEM

(75) Inventors: Harish Natarahjan, Streamwood, IL (US); Sanjay G. Desai, Lake in the Hills, IL (US); Kevin G. Doberstein, Elmhurst, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 1335 days.

(21) Appl. No.: 12/917,961

(22) Filed: Nov. 2, 2010

(65) Prior Publication Data

US 2012/0106536 A1    May 3, 2012

(51) Int. Cl.
*H04B 7/212* (2006.01)
*H04L 7/04* (2006.01)
*H04W 56/00* (2009.01)

(52) U.S. Cl.
CPC ............ *H04L 7/042* (2013.01); *H04W 56/0025* (2013.01)

(58) Field of Classification Search
None
See application file for complete search history.

(56) References Cited

U.S. PATENT DOCUMENTS

| | | | |
|---|---|---|---|
| 3,813,496 A | 5/1974 | Maillet | |
| 5,513,183 A | 4/1996 | Kay et al. | |
| 5,570,370 A * | 10/1996 | Lin | 370/347 |
| 6,088,588 A | 7/2000 | Osborne | |
| 6,363,055 B1 | 3/2002 | Sasson | |
| 6,489,803 B1 | 12/2002 | Steiner et al. | |
| 7,318,185 B2 | 1/2008 | Khandani et al. | |
| 2002/0068572 A1 | 6/2002 | Chun et al. | |
| 2003/0043761 A1 | 3/2003 | Hladik | |
| 2003/0185167 A1 | 10/2003 | Paneth et al. | |

(Continued)

FOREIGN PATENT DOCUMENTS

DE    19818514 A1    11/1999

OTHER PUBLICATIONS

International Search Report and Written Opinion International Patent Application No. PCT/US2011059934 issued on Aug. 17, 2012.

(Continued)

*Primary Examiner* — John Blanton
*Assistant Examiner* — Thinh Tran
(74) *Attorney, Agent, or Firm* — Kenneth A. Haas

(57) ABSTRACT

A method and apparatus for synchronizing a communication device in a communication system includes receiving a transmission from another communication device. The transmission comprises a plurality of time slots and a plurality of signaling fields inserted between the time slots. The plurality of signaling fields include a set of signaling fields of a first information type and a set of signaling fields of a second information type. The method includes detecting at least two consecutive signaling fields of the first information type, recovering a received pattern contained in a $n^{th}$ signaling field of the second information type, predicting patterns corresponding to $(n+1)^{th}$ to $(k-1)^{th}$ signaling fields of the second information type, comparing previously predicted patterns corresponding to the $(n)^{th}$ signaling field with the recovered pattern in the received $(n)^{th}$ signaling field and achieving synchronization when at least 'm' matches are obtained between the predicted and the recovered patterns.

19 Claims, 5 Drawing Sheets

(56) References Cited

U.S. PATENT DOCUMENTS

| | | |
|---|---|---|
| 2005/0124334 A1 | 6/2005 | Rajkotia |
| 2006/0013188 A1 | 1/2006 | Wiatrowski et al. |
| 2007/0207750 A1 | 9/2007 | Brown et al. |
| 2008/0013478 A1* | 1/2008 | Rangan et al. ............... 370/328 |
| 2010/0098051 A1 | 4/2010 | Uemura |
| 2010/0172647 A1* | 7/2010 | Luo et al. ..................... 398/66 |
| 2011/0032429 A1 | 2/2011 | Bing |
| 2011/0267939 A1 | 11/2011 | Streed et al. |
| 2012/0106536 A1 | 5/2012 | Natarahjan et al. |
| 2012/0134353 A1 | 5/2012 | Streed et al. |
| 2013/0155922 A1* | 6/2013 | Becker et al. .................. 370/310 |

OTHER PUBLICATIONS

Non Final Office Action mailed Dec. 7, 2012 in related U.S. Appl. No. 12/771,139, James E. Streed, filed Apr. 30, 2010.

Non Final Office Action mailed Jan. 4, 2013 in related U.S. Appl. No. 12/957,072, James E. Streed, filed Nov. 30, 2010.

* cited by examiner

| I - ISCH REFERENCE | CHANNEL NUMBER | ISCH LOC | ULTRAFRAME_COUNT |
|---|---|---|---|
| 310-0 | %00 | %00 | %00 |
| 310-1 | %01 | %00 | %00 |
| 310-2 | %00 | %01 | %00 |
| 310-3 | %01 | %01 | %00 |
| 310-4 | %00 | %10 | %00 |
| 310-5 | %01 | %10 | %00 |
| 311-0 | %00 | %00 | %01 |
| 311-1 | %01 | %00 | %01 |
| 311-2 | %00 | %01 | %01 |
| 311-3 | %01 | %01 | %01 |
| 311-4 | %00 | %10 | %01 |
| 311-5 | %01 | %10 | %01 |
| 312-0 | %00 | %00 | %10 |
| 312-1 | %01 | %00 | %10 |
| 312-2 | %00 | %01 | %10 |
| 312-3 | %01 | %01 | %10 |
| 312-4 | %00 | %10 | %10 |
| 312-5 | %01 | %10 | %10 |
| 313-0 | %00 | %00 | %11 |
| 313-1 | %01 | %00 | %11 |
| 313-2 | %00 | %01 | %11 |
| 313-3 | %01 | %01 | %11 |
| 313-4 | %00 | %10 | %11 |
| 313-5 | %01 | %10 | %11 |

*FIG. 5*

METHOD AND APPARATUS FOR ACHIEVING SYNCHRONIZATION IN A WIRELESS COMMUNICATION SYSTEM

FIELD OF THE DISCLOSURE

The present disclosure relates generally to communication systems and more particularly to a method and apparatus for achieving synchronization in a wireless communication system.

BACKGROUND

Public safety agencies have a need for a communication network providing increased functionality, secure communication, and improved digital voice quality over a wider coverage area. One such network is defined by the Association of Public-Safety Communications Officials (APCO) Project 25 (P25). APCO P25 is an industry-wide effort to set the recommended voluntary standards of uniform digital two-way radio technology for public safety organizations. Key objectives of these standards include providing enhanced functionality with equipment and capabilities focused on public safety needs, improving spectrum efficiency, ensuring competition among multiple vendors through Open Systems Architecture, and allowing effective, efficient, and reliable intra-agency and inter-agency communications.

One important aspect of any wireless communication standard is providing a mechanism for signaling synchronization information to both receiving and transmitting radios. One such mechanism is defined in the APCO Project 25 standard, where an infrastructure device provides synchronization information through the outbound control channel (CCH) or voice channel (VCH). In certain situations, when the subscribers of a communication network such as a Time Division Multiple Access (TDMA) network, receive a call assignment before achieving synchronization with the VCH or when the CCH and VCH in the network are not synchronized with each other, the APCO P25 Phase 2 standard "PROJECT 25 Phase 2 Two-Slot Time Division Multiple Access Media Access Control Layer Protocol Specification-Trunked Voice Services" defines the use of Inter Slot Signaling Channels (ISCHs) to achieve synchronization. The ISCHs are present in the outbound transmissions sent by the infrastructure device over the VCH. The outbound transmission has an Ultraframe structure including a plurality of ISCHs. Although the standard defines the placement and structure of the ISCHs within the Ultraframe, it does not provide with any specific mechanism to synchronize to the Ultraframe structure.

Accordingly, there is a need for a method and apparatus for achieving synchronization in a wireless communication system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5 illustrates a Table showing binary values associated with a field in the frame structure of FIG. 3 in accordance with some embodiments.

Figure 1:
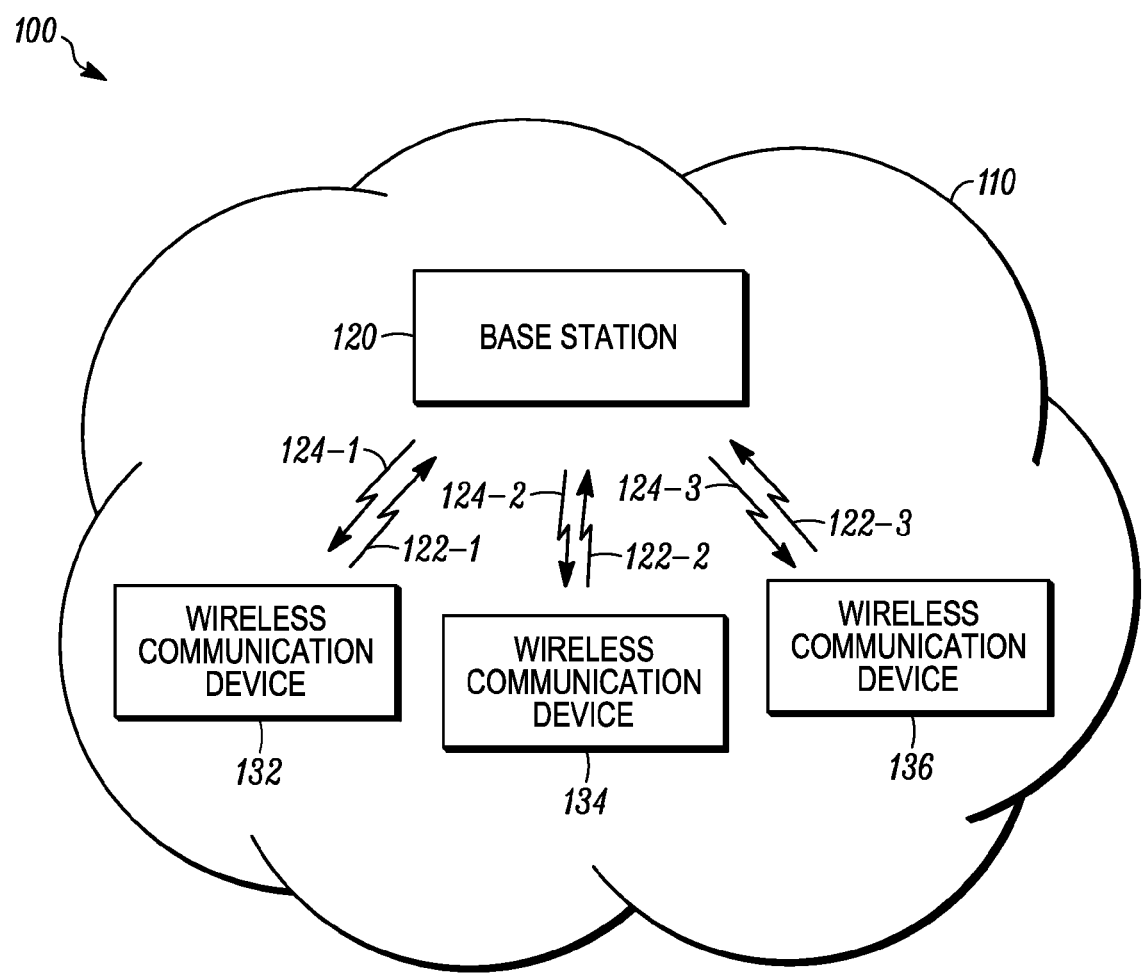
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method and apparatus for synchronizing a plurality of wireless communication devices in a wireless communication system is described herein. The method includes a wireless communication device sending a plurality of transmissions to other wireless communication devices in the wireless communication system. Each transmission comprises a plurality of time slots carrying voice or data and synchronization information inserted between the time slots. The synchronization information includes a first information type, signaling pattern 'A', and a second information type, signaling pattern 'B'. The first information type, signaling pattern 'A', contains a synchronization pattern while the second information type, signaling pattern 'B', defines a frame structure associated with each transmission. In other words, the information in signaling patterns 'A' and 'B' include the frame synchronization information to enable receiving wireless communication devices to achieve synchronization with a transmitting wireless communication device. The wireless communication devices operating according to a specific protocol include predefined data defining the positioning of the signaling patterns 'A' and 'B' within the transmission. The method includes at least one of the receiving wireless communication devices detecting at least two signaling patterns of the first information type (signaling pattern 'A') and consequently, determining the positions of the second information type (signaling pattern 'B') in the received transmission. The receiving wireless communication device further attempts to recover and decode information contained in at least one signaling pattern 'B' and predict the information content of future signaling patterns 'B' based on the information obtained by decoding the at least one signaling pattern 'B'. The receiving wireless communication device then searches for at least 'm' matches between information recovered in the signaling patterns 'B' and information predicted from previous signaling patterns 'B'. On completing the above operations, the receiving wireless communication device ascertains the structure of the transmission and thus achieves synchronization with the transmitting wireless communication device.

In accordance with some embodiments, the method includes a wireless communication device receiving a plurality of transmissions from another wireless communication device, wherein each transmission comprises a plurality of time slots carrying voice or data and a plurality of signaling fields inserted between the time slots. The plurality of signaling fields include a first set of signaling fields of a first information type and a second set of signaling fields of a second information type. The method includes detecting at least two consecutive signaling fields of the first information type in at least one of the plurality of received transmissions, recovering and decoding information pattern contained in at least an $n^{th}$ signaling field of the second information type following the detected two consecutive signaling fields of the first information type and predicting the information pattern of subsequent signaling fields corresponding to the $(n+1)^{th}$ to $(k-1)^{th}$ signaling fields of the second information type based on the recovered information pattern contained in the $n^{th}$ signaling field of the second information type, wherein 'n' is less than 'k−1' and 'n' is greater than zero. The method further includes comparing at least one of a plurality of previously predicted information patterns corresponding to the $(n)^{th}$ signaling field of the second information type with the recovered information pattern contained in the $(n)^{th}$ signaling field of the second information type. Synchronization is achieved when at least 'm' matches are obtained between the predicted information patterns and the recovered information pattern.

In accordance with another embodiments, the above method further includes recovering and decoding another information pattern contained in the $(n+1)^{th}$ signaling field of the second information type following the $n^{th}$ signaling field of the second information type, comparing the predicted information pattern corresponding to $(n+1)^{th}$ signaling field with the decoded information pattern contained in the $(n+1)^{th}$ signaling field, and achieving synchronization when a total of at least 'm' matches of the predicted information pattern are found.

The method continues by performing recursively the operations of predicting, recovering, decoding, and comparing the information content corresponding to $(n+2)^{th}$ through $(k-1)^{th}$ signaling fields to the predicted information content until 'm' matches are found between the recovered information pattern and the predicted information pattern or the $k^{th}$ signaling field is recovered without at least 'm' matches occurring, wherein 'n', 'k' and 'm' are integer variables. The variable 'n' represents a number of the currently recovered signaling field of the second information type, 'k' represents the maximum number of iterations for achieving synchronization, and 'm' represents the minimum number of matches required to achieve synchronization. The terms information content, information pattern, and patterns convey the same meaning and are used interchangeably.

Referring to the figures, FIG. 1 is a block diagram of a communication system 100 for performing synchronization among a plurality of wireless communication devices in accordance with some embodiments. In accordance with some embodiments the communication system 100 is an APCO Phase 2 TDMA system. The teachings herein are not limited to APCO systems and can be applied to other systems having two or more types of signaling patterns in a certain order and enabling the determination of an overall frame structure.

Referring to FIG. 1, the communication system 100 includes a base station (BS) 120 serving a coverage area 110, also referred to as a site or a cellular site. The coverage area 110 includes a plurality of wireless communication devices 132, 134, and 136 serviced by the base station 120. As used herein, the base station 120 is an infrastructure device that can receive information from one or more wireless communication devices 132, 134, and 136 via logical uplink channels 122-1, 122-2, and 122-3, respectively. Further, the BS 120 can transmit information to one or more wireless communication devices 132, 134, and 136 via logical downlink channels 124-1, 124-2, and 124-3, respectively. A base station 120 includes, but is not limited to, equipment commonly referred to as base transceiver stations, access points, routers or any other type of wireless communication devices interfacing device in a wireless environment As referred to herein, a mobile unit (one of 132, 134, and 136) includes, but is not limited to, devices commonly referred to wireless communication devices such as mobile radios, mobile stations, subscriber units, access terminals, mobile devices, or any other device capable of operating in a wireless environment. Examples of communication devices include, but are not limited to, two-way radios, mobile phones, cellular phones, Personal Digital Assistants (PDAs), laptops and pagers.

Returning to FIG. 1, in accordance with some embodiments, wireless communication devices (WCDs) (e.g. one or more of 132, 134, and 136) in the communication system 100 achieve synchronization with the BS 120 using the methods described herein.

Only a limited number of BS and WCDs are shown for the ease of illustration. However, the communication system 100 can include any number of BSs to support any number of WCDs based on system requirements. Moreover, embodiments are not dependent on the protocol(s) used to facilitate communications in the communication system 100 and can be used with any such protocols.

In general, communication links (also referred to herein as communication channels or channels) comprise the physical communication resources over which information is sent between different elements in the communication system 100 and can include wired links or wireless links (e.g., 122-1, 122-2, 122-3, 124-1, 124-2, and 124-3) with a wireless interface between the equipment in the communication system 100 being defined by the protocols implemented in the communication system 100. For example, as illustrated in FIG. 1, the BS 120 can forward control channel information for synchronization or voice channel information having an Ultraframe structure to the WCDs 132, 134, and 136 via downlink or forward channel 124-1, 124-2, and 124-3, respectively. The BS 120 can further receive data or control information from one or more WCDs 132, 134, and 136 via respective logical uplink or reverse channels 122-1, 122-2, and 122-3.

In an APCO TDMA Phase 2 system, each logical channel pair link, e.g., 122-124 constitute a pair of physical layer radio frequency (RF) channels. The downlink or forward channel includes physical layer channels transmitted from the BS 120 to the WCDs 132, 134, and 136, wherein the forward channel is also capable of supporting broadcast and multicast of control information and data information such as but not limited to audio data and video data. The uplink or reverse channel includes the physical layer channels transmitted from the WCDs 132, 134, and 136 to the BS 120.

The embodiments are described in the context of an APCO Phase 2 TDMA system for ease of illustration. However, the embodiments are not limited to such a system but can be applied within any other system that employs multiple carrier frequencies for multiple services.

Figure 2:
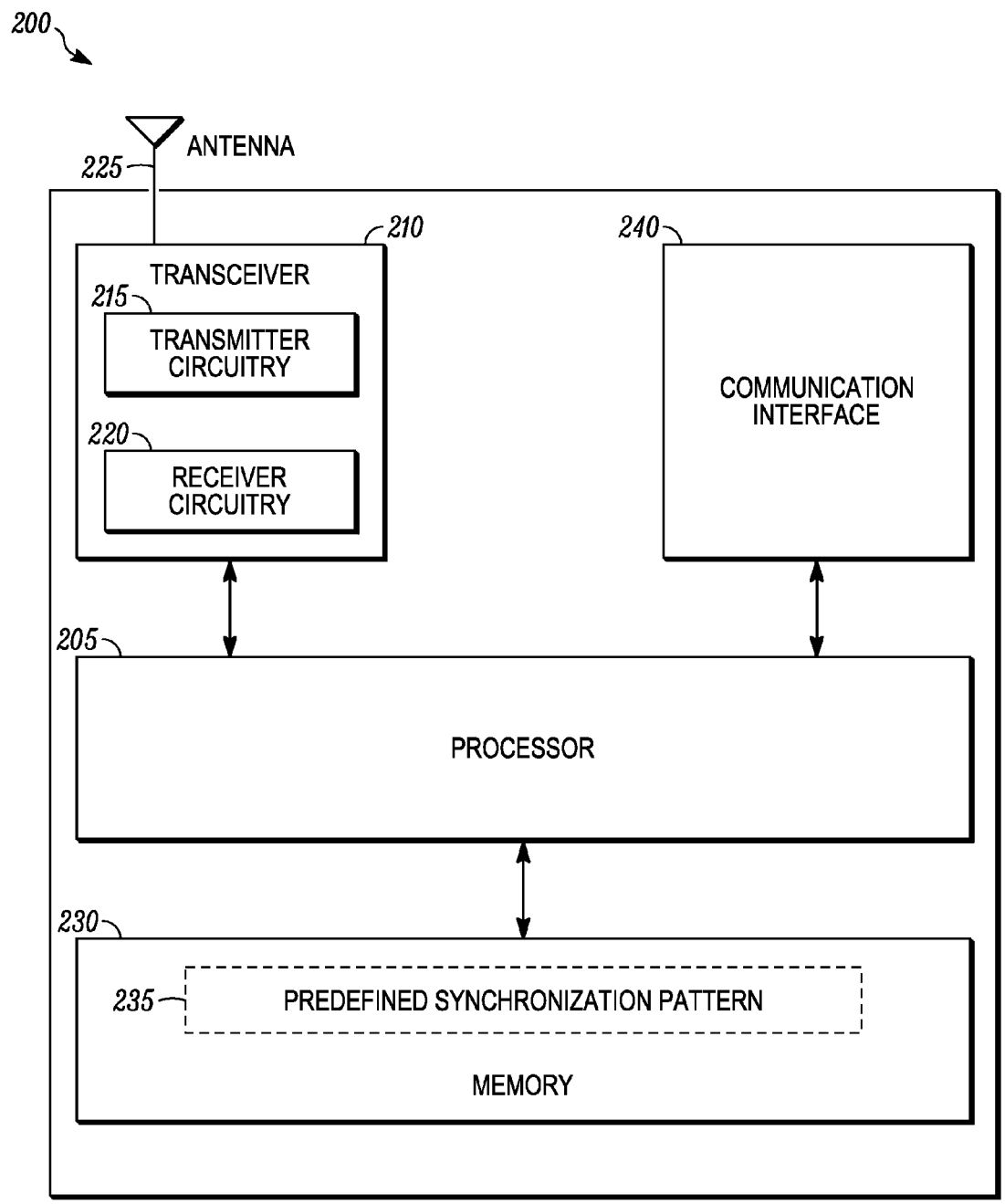
FIG. 2 is a block diagram illustrating an embodiment of a communication device employed in the communication system of FIG. 1.

FIG. 2 is a block diagram of a communication device 200 illustrating the internal components according to one embodiment. The communication device 200 can be one of the wireless communication devices 132, 134, and 136 in the communication system 100. The communication device 200 includes a processor 205, a transceiver 210 including a transmitter circuitry 215 and a receiver circuitry 220, an antenna 225, a memory 230 for storing operating instructions that are executed by the processor 205, and a communication interface 240. Although not shown, the communication device 200 also can include an antenna switch, duplexer, circulator, or other highly isolative means (not shown) for intermittently providing radio signals from the transmitter circuitry 215 to the antenna 225 and from the antenna 225 to the receiver circuitry 220. The communication device 200 is an integrated unit containing at least all the elements depicted in FIG. 2, as well as any other elements necessary for the communication device 200 to perform its particular electronic function. Alternatively, the communication device 200 can comprise a collection of appropriately interconnected units or devices, wherein such units or devices perform functions that are equivalent to the functions performed by the elements of the communication device 200.

The processor 205 includes one or more microprocessors, microcontrollers, DSPs (digital signal processors), state machines, logic circuitry, or any other device or devices that process information based on operational or programming instructions. Such operational or programming instructions are stored in the memory 230. The memory 230 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing digital information. One of ordinary skill in the art will recognize that when the processor 205 has one or more of its functions performed by a state machine or logic circuitry, the memory 230 containing the corresponding operational instructions can be embedded within the state machine or logic circuitry. The operations performed by the processor 205 and the other elements of the communication device 200 are described in detail below.

The transmitter circuitry 215 and the receiver circuitry 220 enable the communication device 200 to communicate radio signals to and acquire signals from the BS 120. In this regard, the transmitter circuitry 215 and the receiver circuitry 220 include appropriate, conventional circuitry to enable digital or analog transmissions over a wireless communication channel. The implementations of the transmitter circuitry 215 and the receiver circuitry 220 depend on the implementation of the communication device 200. For example, the transmitter circuitry 215 and the receiver circuitry 220 can be implemented as an appropriate wireless modem, or as conventional transmitting and receiving components of two-way wireless communication devices. In the event that the transmitter circuitry 215 and the receiver circuitry 220 are implemented as a wireless modem, the modem can be internal to the communication device 200 or insertable into the communication device 200 (e.g., embodied in a wireless radio frequency (RF) modem implemented on a Personal Computer Memory Card International Association (PCMCIA) card or a universal serial bus (USB) card). For a wireless communication device, the transmitter circuitry 215 and the receiver circuitry 220 are implemented as part of the wireless device hardware and software architecture in accordance with known techniques. One of ordinary skill in the art will recognize that most, if not all, of the functions of the transmitter circuitry 215 and/or the receiver circuitry 220 can be implemented in a processor, such as the processor 205. However, the processor 205, the transmitter circuitry 215, and the receiver circuitry 220 have been artificially partitioned herein to facilitate a better understanding.

The receiver circuitry 220 is capable of receiving radio frequency (RF) signals from at least one frequency band and optionally multiple frequency bands, when, for example, the communications with a proximate device are in a frequency band other than that of the system communications. The transceiver 210 includes one set of transmitter circuitry 215. The antenna 225 comprises any known or developed structure for radiating and receiving electromagnetic energy in the frequency range containing the wireless carrier frequencies. The communication interface 240 uses transceiver 210 to enable the communication device 200 to communicate with other devices and/or systems.

As illustrated in FIG. 2, the memory 230 stores one or more predefined synchronization patterns 235 for synchronizing with the communication system 100.

Figure 3:
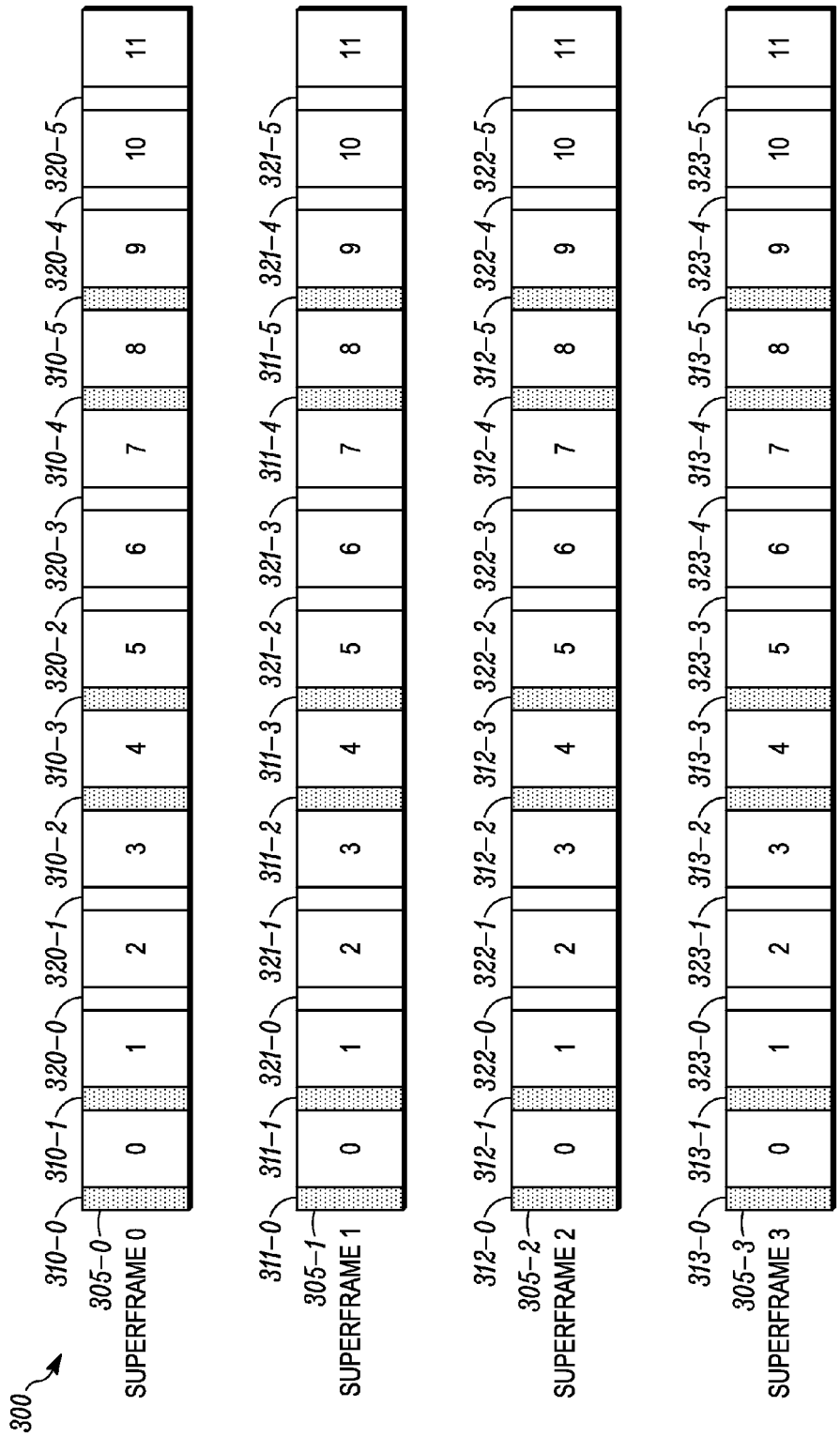
FIG. 3 illustrates a frame structure for voice channel signaling in accordance with some embodiments.

FIG. 3 illustrates a frame structure 300 of an outbound transmission from the BS 120 over a voice channel (VCH) in the communication system 100 in accordance with some embodiments. The frame structure 300 is continuously repeated for the duration of the transmission. As illustrated, the frame structure 300 also called as an Ultraframe structure includes a plurality of superframes. Each Ultraframe 300 includes a set of four consecutive superframes 305-0, 305-1, 305-2, and 305-3. In a typical APCO Phase 2 TDMA system, each superframe 305-0, 305-1, 305-2, and 305-3 contains twelve time slots of thirty milli seconds (30 msec) each and are partitioned into two logical VCHs. Hence, each superframe has a duration of three hundred and sixty milli seconds (360 msec) thereby forming an Ultraframe structure 300 with a time duration of 1.44 seconds Referring to the Ultraframe 300, each superframe 305-0, 305-1, 305-2, 305-3 includes a plurality of signaling fields known as Inter-slot Signaling Channels (ISCHs) inserted between the time slots (0-11). The plurality of signaling fields include a first set of signaling fields carrying a first information type and a second set of signaling fields carrying a second information type.

As illustrated in FIG. 3, the superframe 305-0 includes two first information type ISCHs known as Synchronization ISCHs (S-ISCH) 320 alternating with two second information type ISCHs called as Information ISCHs (I-ISCHs) 310, in between the time slots 0-11 of the superframe 305-0. For example, the first I-ISCH 310-0 (before the time slot 0 of the superframe 305-0) and the second I-ISCH 310-1 (between the time slots 0 and 1 of the superframe 305-0) are followed by the first S-ISCH 320-0 (between the time slots 1 and 2 of the superframe 305-0) and the second S-ISCH 320-1 (between the time slots 2 and 3 of the superframe 305-0). Third and fourth I-ISCHs 310-2 and 310-3 (between the time slots 3 and 4 and time slots 4 and 5 of the superframe 305-0, respectively) are followed by the third and fourth S-ISCHs 320-2 and 320-3 (between the time slots 5 and 6 and time slots 6 and 7 of the superframe 305-0, respectively). Fifth and sixth I-ISCHs 310-4 and 310-5 (between the time slots 7 and 8 and time slots 8 and 9 of the superframe 305-0, respectively) are followed by the fifth and sixth S-ISCHs 320-4 and 320-5 (between the time slots 9 and 10 and time slots 10 and 11 of the superframe 305-0, respectively). I-ISCHs and S-ISCHs alternate in a similar fashion in all the superframes 305-0 through 305-3.

In a typical APCO Phase 2 TDMA system any two consecutive I-ISCHs or S-ISCHs are separated by a time duration of 30 msec. Each S-ISCH (for example, 320-0-320-5, 321-0-321-5, 322-0-322-5, and 323-0-323-5) includes a sync pattern consisting of forty (40) bits. Each I-ISCH (for example, 310-0-310-5, 311-0-311-5, 312-0-312-5, and 313-0-313-5) is a forty (40) bit modulated sequence, wherein the forty bit sequence is obtained by encoding the information content made up of nine information bits.

In general, the nine information bits of an I-ISCH are arranged in the following format:

| Reserved | Channel No | ISCH Loc | FR | Ultraframe_Count |
| --- | --- | --- | --- | --- |

The nine information bits convey the following data: a logical channel number of the voice channel (VCH) on the physical channel (Channel No), location information corresponding to the location of the ISCH in the superframe (ISCH Loc), a frame count corresponding to the position of the superframe in the Ultraframe (Ultraframe_Count) field, a field to indicate whether the next inbound signaling slot is free for listening radio use (FR) and a reserved field. The logical channel number (Channel No) field determines whether the subsequent slot is logical VCH channel 0 or logical VCH channel 1 of the TDMA channel. The ISCH sequence location field (ISCH Loc) gives the location of the I-ISCH sequence within the superframe i.e. based on the value of the ISCH Loc field, the WCD 132, 134, 136 can determine whether a particular I-ISCH sequence is a first, second, or a third I-ISCH sequence in the received superframe. The Ultraframe_Count field gives the location of the current superframe within the Ultraframe 300, for example, whether the current superframe is the first, second, third, or the last superframe in the received Ultraframe 300. The (FR) field gives an indication to the wireless communication devices 132, 134, and 136 whether or not the next inbound signaling timeslot is free for an access.

The values of Channel No, ISCH Loc, and Ultraframe_Count fields increment in a pre-defined manner, thereby, allowing the prediction of future values corresponding to each field once a first set of values corresponding to each field is known. The Table 1 as shown in FIG. 5 gives the binary representation of values corresponding to each I-ISCH (for example, 310-0-310-5, 311-0-311-5, 312-0-312-5, and 313-0-313-5) based on its location in the Ultraframe as shown in FIG. 3. In one example, as shown below in Table 1, the first I-ISCH 310-0 has the value of Channel No=% 00 (wherein the "%" notation indicates a binary number representation) representing that the subsequent slot is logical voice channel 0, the value of ISCH Loc=% 00 representing that the particular I-ISCH sequence is the first one in the superframe 305-0, and the value of Ultraframe_Count=% 00 representing that the particular superframe is the first one in the received Ultraframe 300. Also, from the Table 1 prediction of subsequent I-ISCHs can easily be accomplished using the information content value of the currently decoded I-ISCH. For example, the row containing the currently decoded information content is located in the table and the predicted future values are taken from the information values in the subsequent rows. In one example, if the value of an I-ISCH, for example, I-ISCH 310-3 is decoded and the fields values are determined to be Channel No=% 01, ISCH Loc=% 01, and Ultraframe_Count=% 00, then the Channel No, the ISCH Loc, and the Ultraframe_Count values corresponding to the subsequent I-ISCHs, in this example, I-ISCHs 310-4, 310-5, and 311-0, are obtained from the Table 1.

FIG. 5, Table 1 is not limited to the prediction of I-ISCHs within a single Ultraframe transmission and can be applied for predicting I-ISCHs in the subsequent Ultraframe transmissions based on the I-ISCH information obtained from the current Ultraframe.

Figure 4:
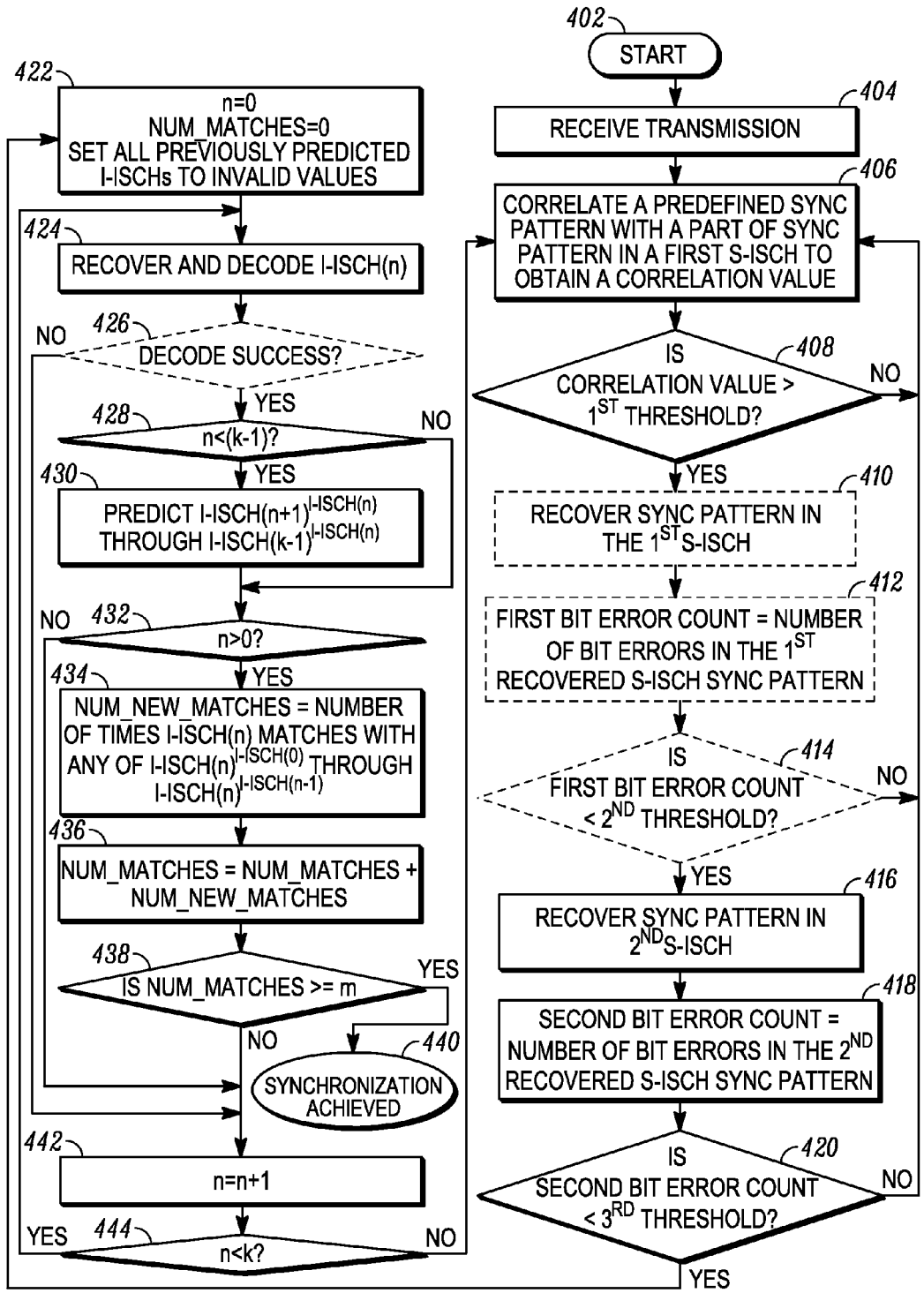
FIG. 4 illustrates a flow diagram of a method for achieving synchronizing in a communication system in accordance with some embodiments.

FIG. 4 is a flow diagram of a method 400 performed by a wireless communication device, for example, the WCD 132, 134, 136, for achieving synchronizing in the communication system 100 in accordance with some embodiments. The flow diagram shown is only for simplifying the explanation of the process and does not require any time delay to start with the process.

Returning to FIG. 4, method 400, the WCD 132, 134, 136 starts 402 to receive 404 a transmission from another wireless communication device or an infrastructure device such as the BS 120. The transmission includes of at least some portion of the Ultraframe structure 300 as illustrated above in FIG. 3. Also, the transmission can include any number of repeats of the Ultraframe structure 300.

Referring to FIG. 4, upon receiving 404 a transmission containing the Ultraframe structure 300, the WCD 132, 134, 136 first proceeds with detecting at least two consecutive signaling fields of the first information type by performing the following operations. Upon receiving 404 a transmission 300 containing at least a portion of an Ultraframe, the WCD 132, 134, 136, performs correlation 406 of a predefined synchronization pattern with at least a part of a synchronization pattern (otherwise called as sync pattern) contained in a first S-ISCH of the received transmission 300 to obtain a correlation value. In one example, the first S-ISCH can be S-ISCH 320-0 in the superframe 305-0 (see FIG. 3). After obtaining the correlation value, a determination 408 is made whether the correlation value is greater than a first threshold level. If the correlation value is not greater than the first threshold level, the WCD 132, 134, 136 goes back to perform the operation 406 and reiterates the other operations until two consecutive S-ISCHs are detected.

On the other hand, if the correlation value is greater than the first threshold level, the WCD 132, 134, 136 proceeds with recovering 410 a sync pattern contained in the first S-ISCH, for example, S-ISCH 320-0 and obtaining 412 a first bit error count by computing the number of bit errors associated with the recovered 410 sync pattern. The WCD 132, 134, 136 then determines 414 whether the first bit error count is less than a second threshold level. If the first bit error count is not less than the second threshold level, the WCD 132, 134, 136 goes back to perform the operation 406 and reiterates the other operations until two consecutive S-ISCHs are detected.

On the other hand, if the first bit error count is less than the second threshold level, the WCD 132, 134, 136 proceeds with recovering 416 another sync pattern contained in a second S-ISCH, for example, S-ISCH 320-1. The operations 410, 412, and 414 are optional and the WCD 132, 134, 136 can directly recover 416 another sync pattern contained in the second S-ISCH when the correlation value is greater than the first threshold level. The WCD 132, 134, 136 then proceeds with obtaining 418 a second bit error count by computing the number of bit errors associated with the recovered 416 another sync pattern. The WCD 132, 134, 136 then determines 420 whether the second bit error count is less than a third threshold level. If the second bit error count is not less than the third threshold level, the WCD 132, 134, 136 goes back to perform the operation 406 and reiterates the other operations until two consecutive S-ISCHs are detected. On the other hand, if the second bit error count is less than the third threshold level, the WCD 132, 134, 136 confirms the detection of two consecutive signaling fields of the first information type or two consecutive S-ISCHs, for example, detection of S-ISCHs 320-0 and 320-1. The first, second, and third threshold levels can be user specified levels or can be set according to the requirements of the communication system 100.

In the method 400, after confirming the detection of two consecutive S-ISCHs, the WCD 132, 134, 136 proceeds with operation 422, wherein the WCD initializes the variables 'n' and 'num_matches' to zero, wherein 'n' and 'num_matches' are integer variables. The variable 'n' represents the I-ISCH currently under process, or in other words 'n' represents a number of the recovered I-ISCH in the received transmission and 'num_matches' represents the total number of matches computed between the recovered I-ISCHs and the predicted I-ISCHs. The matches actually refer to the matching of a subset of or all of the various field values associated with the I-ISCH, for example, value associated with the Channel No, the ISCH Loc, and the Ultraframe_Count fields contained in the predicted I-ISCHs and the recovered I-ISCHs. Referring to the operation 422, as a part of the operation 422 the WCD 132, 134, 136 sets all the previously predicted I-ISCH values to invalid values. In other words, the WCD 132, 134, 136 clears all the previously predicted I-ISCH values. After initializing and clearing 422, the WCD 132, 134, 136 recovers and decodes 424 the frame synchronization information, for example, an information pattern contained in an $n^{th}$ I-ISCH or I-ISCH(n) that follows the detected two consecutive S-ISCHs in the received Ultraframe structure 300. In one embodiment the $n^{th}$ I-ISCH is the I-ISCH immediately following the detected two consecutive S-ISCHs in the received Ultraframe 300.

In the method 400, the WCD 132, 134, 136 in the operation 424 first recovers the information pattern contained in I-ISCH(n) and then decodes the recovered information pattern, wherein, decoding the information pattern includes obtaining information such as logical Channel number (Channel No), ISCH location (ISCH Loc), and Ultraframe count (Ultraframe_Count) from the recovered I-ISCH. In one embodiment, the WCD 132, 134, 136 can use a locally stored look up table containing codewords based on 40-bit encoded versions of all 512 valid combinations of the nine bit I-ISCH information field for decoding and obtaining information such as logical Channel number, ISCH location, and Ultraframe count associated with the I-ISCHs in the received transmissions. Additionally, the WCD 132, 134, 136 could store codewords based on 40-bit encoded versions of only the nine bit patterns that are allowed by the protocol. For example, if % 00 and % 01 are the values valid for the Logical Channel and % 00, % 01 and % 10 are the valid values for the ISCH Location, then the look-up table could be reduced to a set of codewords having 192 valid combinations of the nine bit I-ISCH information field. The number of codewords searched out of the total of codewords in the look up table for a given I-ISCH can also be reduced further by using information known a-priori. For example, the decoder can determine the appropriate logical channel number based on the detected S-ISCHs, which allows the decoder to only search the set of codewords that have the known logical channel number.

In the present example, upon detecting S-ISCHs 320-0 and 320-1, the WCD 132, 134, 136 recovers and decodes 424 information present in the I-ISCH 310-2. In one embodiment, the WCD 132, 134, 136 proceeds with determining 426 whether the decoding is successful or not. If the decoding is not successful, the WCD 132, 134, 136 proceeds with incrementing the value of 'n' by one (n=n+1) 442 i.e. the next I-ISCH and proceeds with recovering and decoding 424 the information contained in the next I-ISCH if the incremented value of 'n' in 442 is less than the maximum number of iterations, 'k' (n<k). On the other hand, if the decoding is successful, the WCD 132, 134, 136 continues with the method 400 as explained below.

After recovering and decoding 424 of the information present in I-ISCH(n), the WCD 132, 134, 136 determines 428 whether the value of 'n' is less than a value corresponding to one less than the maximum number of iterations (k) i.e. n<'k−1', wherein 'k' is an integer. If n>=k−1, the WCD 132, 135, 136 skips the predicting operation 430 and proceeds to operation 432. However, if n<k−1, the WCD 132, 134, 136 proceeds with predicting 430 the next set of I-ISCHs based on the presently recovered and decoded I-ISCH(n). In other words, the WCD 132, 134, 136 proceeds with predicting 430 values corresponding to I-ISCH(n+1), I-ISCH(n+2) . . . I-ISCH(k−1), based on the currently recovered I-ISCH(n)

In one example, I-ISCH(1), I-ISCH(2), I-ISCH(3) . . . I-ISCH(k−1) predicted based on I-ISCH(0) and are denoted as I-ISCH(1)$^{I\text{-}ISCH(0)}$, I-ISCH(2)$^{I\text{-}ISCH(0)}$, I-ISCH(3)$^{I\text{-}ISCH(0)}$ . . . I-ISCH(k−1)$^{I\text{-}ISCH(0)}$. After predicting 430 the subsequent I-ISCHs, the WCD 132, 134, 136 proceeds with determining 432 whether the value of 'n' is greater than zero (n>0). If the value of 'n' is not greater than zero the WCD 132, 134, 136 proceeds with the operation of incrementing 442 the value of 'n' by one (n=n+1) and continues with the method 400. On the other hand, if n>0 432, the WCD 132, 134, 136 obtains 434 'new_num_matches' by computing the number of times the recovered I-ISCH(n) matches the previously predicted I-ISCH(n)$^{I\text{-}ISCH(0)}$ through I-ISCH(n)$^{I\text{-}ISCH(n-1)}$. The 'new_num_matches' is an integer variable having a value corresponding to the number of times the current I-ISCH matches the plurality of corresponding previously predicted I-ISCHs. The WCD 132, 134, 136 further computes 436 the total number of matches for the current and all previous iterations 'num_matches' as a sum of the total number of matches 'num_matches' calculated in the previous iterations and the obtained 434 'new_num_matches'. Upon computing 436 the current 'num_matches' the WCD 132, 134, 136 determines 438 whether the computed 436 'num_matches' is greater than or equal to the minimum number of matches 'm' required to achieve synchronization. If the 'num_matches' is greater than or equal to 'm' the WCD 132, 134, 136 achieves 440 synchronization with the BS 120.

On the other hand, if the 'num_matches' is less than 'm', the WCD 132, 134, 136 proceeds with recovering the information contained in the next I-ISCH i.e, the value of 'n' is incremented by one (n=n+1) 442 and a determination 444 is made whether the value of 'n' is less than the maximum number of iterations 'k' (n<k). If n<k, the WCD 132, 134, 136 continues with performing recursively the operations of recovering and decoding 424, through determining 444 until synchronization is achieved or until 'n' becomes greater than or equal to 'k'. When n≥k and synchronization is not achieved, the WCD 132, 134, 136 proceeds with the operation 406 and continues to perform recursively the operations of the method 400 until synchronization is achieved.

The following example illustrates the method 400 for achieving synchronization by the WCD (one of 132, 134, 136) for a specific case when the maximum number of iterations 'k' is defined to be equal to four (k=4) and the minimum number of matches 'm' required to achieve synchronization is two (m=2). In the present example, assuming that the WCD 132, 134, 136 has detected two consecutive S-ISCHs in operations 404 through 420, for example S-ISCHs 323-3 and 323-4 in the superframe 3 305-3 (of the current Ultraframe 300), the WCD proceeds with the operation 422 of initializing the variable 'n' and 'num_matches' to zero and clearing all the previously predicted I-ISCHs.

The WCD 132, 134, 136 proceeds with recovering and decoding 424 information contained in the first I-ISCH i.e. I-ISCH(0) following the detected two consecutive S-ISCHs.

In the present example the WCD 132, 134, 136 recovers information contained in I-ISCH 313-4 which follows the S-ISCHs 323-3 and 323-4 (as shown in FIG. 3). The WCD 132, 134, 136 proceeds with the determining 428 whether 'n' is less than 'k−1'. In the present example, n=0 and k−1=3 therefore, n is less than k−1. The WCD 132, 134, 136 proceeds with the operation of predicting 434 a frame synchronization information contained in the) subsequent I-ISCHs i.e, predicting values corresponding to I-ISCH$(1)^{I\text{-}ISCH(0)}$, I-ISCH$(2)^{I\text{-}ISCH(0)}$, and I-ISCH$(3)^{I\text{-}ISCH(0)}$. For example, I-ISCHs 313-5 (in superframe 305-3 of the current Ultraframe 300), 310-0 (in the superframe 305-0 of the next Ultraframe 300), and 310-1 (in the superframe 305-0 of the next Ultraframe 300), are predicted based on the recovered I-ISCH 313-4. After predicting 430 I-ISCH$(1)^{I\text{-}ISCH(0)}$, I-ISCH$(2)^{I\text{-}ISCH(0)}$, and I-ISCH$(3)^{I\text{-}ISCH(0)}$ the WCD 132, 134, 136 proceeds with determining 432 whether the value of 'n' is greater than zero (n>0). Since in the present example the value of n=0, the WCD 132, 134, 136 proceeds with the operation of incrementing 442 'n' by one (n=n+1=1) and checks whether n<k (n<4) 444. In the present example, since 'n' is less than 'k', the WCD 132, 134, 136 recovers and decodes 424 information contained in the next I-ISCH or I-ISCH(1), for example, I-ISCH 313-5, following I-ISCH(0) (I-ISCH 313-4).

After recovering and decoding 424 information in I-ISCH (1), the WCD 132, 134, 136 performs the operation of determining 428 whether the present value of 'n' is less k−1. Since the present value of n=1 and is less than 3, the WCD 132, 134, 136 proceeds with the operations for predicting 430 the next I-ISCHs i.e, I-ISCH$(2)^{I\text{-}ISCH(1)}$ and I-ISCH$(3)^{I\text{-}ISCH(1)}$ for example, I-ISCHs 310-0 and 310-1, based on the recovered I-ISCH(1) (I-ISCH 313-5). The WCD 132, 134, 136 then proceeds to determine 432 whether the current value of 'n' is greater than zero (n>0). Since the present value of n=1 and is greater than zero the WCD 132, 134, 136 proceeds with computing 434 the number of times the recovered I-ISCH(1) matches the previously predicted I-ISCH(1)s, in this case, I-ISCH(1) predicted based on recovered I-ISCH(0) i.e, I-ISCH$(1)^{I\text{-}ISCH(0)}$ to obtain 'num_new_matches'. If the recovered I-ISCH(1) matches ISCH$(1)^{I\text{-}ISCH(0)}$ then the 'num_new_matches' is calculated as one (num_new_matches=1). The WCD 132, 134, 136 further computes 436 the current 'num_matches' as a sum of 'num_matches' calculated in the previous iteration and the obtained 434 'num_new_matches'. In the present example, since the 'num_matches' was initialized to zero the 'num_matches' of the previous iteration is equal to zero. Therefore, the current 'num_matches'=one i.e. num_matches=(previous 'num_matches'=zero)+(num_new_matches=one).

Upon computing 436 'num_matches', the WCD 132, 134, 136 determines 438 whether the computed 436 'num_matches' is greater than or equal to the minimum number of matches 'm' required to achieve synchronization. In the present example, the predefined value of 'm' is equal to two and the current value of 'num_matches' is one which is less than 'm', therefore synchronization is not achieved. The WCD 132, 134, 136 proceeds with incrementing 442 'n' so that 'n' now takes on the value of n=2, and then checks to see if n<k in 444, here since n=2 and k=4, 'n' is less than 'k', so the WCD 132, 134, 136 next proceeds to the operation of recovering and decoding 424 information contained in the next I-ISCH i.e. I-ISCH(2), for example, I-ISCH 310-0.

After recovering and decoding 424 I-ISCH(2), the WCD performs the operation of determining 428 whether the present value of 'n' is less than 'k−1'. Since the present value of n=2 and is less than k=3, WCD 132, 134, 136 proceeds with the operations for predicting 430 the next I-ISCHs, i.e, I-ISCH$(3)^{I\text{-}ISCH(2)}$, for example, I-ISCH 310-1, based on the recovered I-ISCH(2) (I-ISCH 310-0). The WCD 132, 134, 136 then proceeds to determine 432 whether the current value of 'n' is greater than zero (n>0). Since the present value of n=2 and is greater than zero the WCD 132, 134, 136 proceeds with computing 434 the number of times the recovered I-ISCH(2) matches the previously predicted I-ISCH(2)s, in this case, I-ISCH(2) predicted based on recovered I-ISCH(0) and I-ISCH (1) i.e, I-ISCH$(2)^{I\text{-}ISCH(0)}$ and I-ISCH$(2)^{I\text{-}ISCH(1)}$ to obtain 'num_new_matches'. For example, if the recovered I-ISCH(2) matches only one of ISCH$(2)^{I\text{-}ISCH(0)}$ or ISCH$(2)^{I\text{-}ISCH(1)}$, then the 'num_new_matches' is set to one (num_new_matches=1). If the recovered I-ISCH(2) matches both of ISCH$(2)^{I\text{-}ISCH(0)}$ or ISCH$(2)^{I\text{-}ISCH(1)}$, then the 'num_new_matches' is set to two (num_new_matches=2). For the purposes of the present example, the recovered I-ISCH(2) is assumed to match only one of ISCH$(2)^{I\text{-}ISCH(0)}$ or ISCH$(2)^{I\text{-}ISCH(1)}$ and therefore the 'num_new_matches' is set to one (num_new_matches=1). The WCD 132, 134, 136 further computes 436 the current 'num_matches' as the sum of 'num_matches' calculated in the previous iteration and the obtained 434 'num_new_matches'. In the previous iteration the 'num_matches' was computed to be equal to one. Therefore, the current 'num_matches'=two (num_matches=(previous 'num_matches'=one)+(num_new_matches=one)).

Upon computing 436 'num_matches', the WCD 132, 134, 136 determines 438 whether the computed 436 'num_matches' is greater than or equal to the minimum number of matches 'm' required to achieve synchronization. In the present example, the predefined value of 'm' is equal to two and the current value of 'num_matches' equal to 'm', therefore synchronization achieved.

On the other hand, if in 434 the recovered I-ISCH(2) does not match either of ISCH$(2)^{I\text{-}ISCH(0)}$ or ISCH$(2)^{I\text{-}ISCH(1)}$ then num_new_matches is set to zero and num_matches remains unchanged from the previous iteration, that is, num_matches=1. In the current iteration of the operation 438, since num_matches is less than 'm', WCD 132, 134, 136 proceeds with incrementing 442 'n' so that 'n' now takes on the value of n=3, and then checks to see if n<k in 444, here since n=3 and k=4, 'n' is less than 'k', so the WCD 132, 134, 136 next proceeds to the operation of recovering and decoding 424 information contained in the next I-ISCH i.e. I-ISCH(3), for example, I-ISCH 310-1.

After recovering I-ISCH(3), the WCD performs the operation of determining 428 whether the present value of 'n' is less than 'k−1'. Since the present value of n=3 and is equal to k−1=3, the WCD 132, 134, 136 proceeds to determine 432 whether the current value of 'n' is greater than zero (n>0). Since the present value of n=3 and is greater than zero the WCD 132, 134, 136 proceeds with computing 434 the number of times the recovered I-ISCH(3) matches the previously predicted I-ISCH(3)s, in this case, the I-ISCH(3)s predicted based on recovered I-ISCH(0), I-ISCH(1), and I-ISCH(2) i.e, I-ISCH$(3)^{I\text{-}ISCH(0)}$, I-ISCH$(3)^{I\text{-}ISCH(1)}$ and I-ISCH$(3)^{I\text{-}ISCH(0)}$ to obtain 'num_new_matches'. If the recovered I-ISCH(3) matches with one of ISCH$(3)^{I\text{-}ISCH(0)}$, I-ISCH$(3)^{I\text{-}ISCH(1)}$ and I-ISCH$(3)^{I\text{-}ISCH(2)}$ then the 'num_new_matches' is set to one (num_new_matches=1). If the recovered I-ISCH(3) matches with only two of ISCH$(3)^{I\text{-}ISCH(0)}$, I-ISCH$(3)^{I\text{-}ISCH(1)}$, and I-ISCH$(3)^{I\text{-}ISCH(2)}$ then the 'num_new_matches' is set to two (num_new_matches=2). If the recovered I-ISCH(3) matches with all three of ISCH$(3)^{I\text{-}ISCH(0)}$, I-ISCH$(3)^{I\text{-}ISCH(1)}$ and I-ISCH$(3)^{I\text{-}ISCH(2)}$ then the 'num_new_matches' is set to three (num_new_matches=3). The WCD 132, 134, 136 the proceeds with computing 436 the current 'num_matches' and determining 438 whether the current 'num_matches' is greater than 'm'. The WCD 132, 134, 136 then achieves synchronization if current 'num_matches' is greater than the minimum required matches 'm'.

The method 400 is performed iteratively until synchronization is achieved i.e, until 'm' matches are achieved or the $k^{th}$ signaling field is recovered without at least 'm' matches occurring.

Advantages of the various embodiments include: enabling synchronization in the communication system by using Inter Slot Signaling Channels such as the I-ISCHs and the S-ISCHs in the voice channel. The present method achieves synchronization by synchronizing initially with a signaling channel of a first information type and searching 'k' instances of a signaling channel of a second information type for 'm' matches of predicted future values. If 'm' or more matches are found, synchronization is achieved to the Ultraframe structure. In other words, the present method achieves synchronization by initially detecting two S-ISCHs and then, for example, decoding at most 'k' I-ISCHs following the detected S-ISCHs. This avoids searching for S-ISCHs each time. Further advantages of the present method includes enabling subscribers receiving a call assignment before receiving a synchronous broadcast message or systems having unsynchronized Control and Voice Channels, to achieve error free synchronization. Those skilled in the art will realize that the above recognized advantages and other advantages described herein are merely illustrative and are not meant to be a complete rendering of all of the advantages of the various embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for synchronizing a plurality of wireless communication devices in a wireless communication system, the method comprising, at a wireless communication device:
receiving a plurality of transmissions from another wireless communication device, wherein each transmission comprises a plurality of time slots carrying voice or data and a plurality of signaling fields inserted between the time slots, wherein the plurality of signaling fields include a first set of signaling fields of a first information type and a second set of signaling fields of a second information type;

detecting at least two consecutive signaling fields of the first information type in at least one of the plurality of received transmissions;

recovering at least two signaling fields of the second information type following the detected two consecutive signaling fields of the first information type;

for each one of the at least two recovered signaling fields of the second information type:
  predicting a plurality of further subsequent signaling fields of the second information type, including at least a third signaling field of the second information type, based on recovered information extracted from the respective one of the at least two recovered signaling fields of the second information type;

responsive to actually receiving some of the plurality of further subsequent signaling fields of the second information type, including at least the third signaling field of the second information type, comparing the predicted further subsequent signaling fields of the second information type with the actual received further subsequent signaling fields of the second information type; and achieving synchronization when a number of matches obtained between the actual received further subsequent signaling fields and the corresponding predicted further subsequent signaling fields meets a threshold number of required matches.

2. The method of claim 1, wherein detecting the at least two consecutive signaling fields of the first information type comprises:
  correlating a predefined synchronization pattern with at least a part of a synchronization pattern contained in one of the two consecutive signaling fields of the first information type to obtain a correlation value;
  determining whether the correlation value is greater than a first threshold level;
  recovering the synchronization pattern contained in the one of the two consecutive signaling fields of the first information type when the correlation value is greater than the first threshold level;
  computing a first bit error count associated with the recovered synchronization pattern;
  recovering another synchronization pattern contained in the other of the two consecutive signaling fields of the first information type when the first bit error count is less than a second threshold level;
  computing a second bit error count associated with the recovered another synchronization pattern; and
  confirming the detection of two consecutive signaling fields of the first information type when the second bit error count is less than a third threshold level.

3. The method of claim 2, further comprising:
  proceeding with the operation of correlating when the correlation value is less than the first threshold level, the first bit error count is greater than the second threshold level, or the second bit error count is greater than the third threshold level; and
  performing recursively the operations of correlating until two consecutive signaling fields of the first information type are detected.

4. The method of claim 1, further comprising:
  decoding the recovered signaling fields to obtain at least one of a channel number, location information, and a frame count associated with signaling fields of the second information type.

5. The method of claim 1, further comprising:
  performing recursively the steps of detecting, recovering, predicting, and comparing until the threshold number of matches is reached.

6. The method of claim 1, further comprising:
  recovering the third signaling field of the second information type; and
  predicting still further subsequent signaling fields of the second information type based on the recovered third signaling field of the second information type.

7. The method of claim 1, wherein the threshold number of required matches is greater than 1.

8. A method for synchronizing a wireless communication device in a time division multiple access (TDMA) voice communication system, the method comprising, at the wireless communication device:
  receiving a plurality of Ultraframe transmissions from an infrastructure device, wherein each Ultraframe transmission comprises a plurality of time slots carrying voice or data and a plurality of inter-slot signaling channels (ISCHs) inserted between the time slots, wherein the plurality of ISCHs include synchronous inter-slot signaling channels (S-ISCHs) and information inter-slot signaling channels (I-ISCHs);
  detecting at least two consecutive S-ISCHs in at least one of the plurality of received Ultraframe transmissions;
  recovering frame synchronization fields contained in each of at least two I-ISCHs following the detected two consecutive S-ISCHs;
  for each one of the at least two recovered frame synchronization fields:
    predicting a plurality of further frame synchronization fields of a plurality of further subsequent I-ISCHs, including at least a third frame synchronization field of a third I-ISCH, based on the recovered frame synchronization field from the respective one of the at least two recovered frame synchronization fields;
  responsive to actually receiving some of the plurality of further subsequent I-ISCHs, including at least the third I-ISCH, comparing the predicted further frame synchronization fields with actual further frame synchronization fields recovered from the actual received further subsequent I-ISCHs; and
  achieving synchronization when a number of matches obtained between the actual received further frame synchronization fields and the corresponding predicted further frame synchronization fields meets a threshold number of required matches.

9. The method of claim 8, further comprising:
  proceeding with the detection of at least two other consecutive S-ISCHs in at least one of the plurality of received Ultraframe transmissions when synchronization is not yet achieved.

10. The method of claim 8, further comprising:
  decoding the actual further frame synchronization field to obtain at least one of logical channel number (Channel No), ISCH sequence location (ISCH Loc), and an Ultraframe count (Ultraframe_Count) associated with the further subsequent I-ISCH.

11. The method of claim 8, wherein predicting the further frame synchronization field includes predicting at least one of logical channel number (Channel No), ISCH sequence location (ISCH Loc), and an Ultraframe count (Ultraframe_Count) associated with the further subsequent I-ISCHs.

12. The method of claim 8, wherein detecting two consecutive S-ISCHs further comprises:

correlating a predefined synchronization pattern with at least a part of a synchronization pattern contained in the first S-ISCH of the two consecutive S-ISCHs to obtain a correlation value;

determining whether the correlation value is greater than a first threshold level;

recovering the synchronization pattern contained in the first S-ISCH, when the correlation value is greater than the first threshold level;

computing a first bit error count associated with the recovered synchronization pattern;

recovering another synchronization pattern contained in the second S-ISCH when the first bit error count is less than a second threshold level;

computing a second bit error count associated with the recovered another synchronization pattern; and confirming the detection of two consecutive S-ISCHs when the second bit error count is less than a third threshold level.

13. The method of claim 12, further comprising:
proceeding with the operation of correlating when the correlation value is less than the first threshold level, the first bit error count is greater than the second threshold level, or the second bit error count is greater than the third threshold level; and performing recursively the operations of correlating until two consecutive S-ISCHs are detected.

14. The method of claim 8, further comprising:
recovering the third frame synchronization field contained in the third I-ISCH; and predicting still further frame synchronization fields of still further subsequent I-ISCHs based on the recovered third frame synchronization field.

15. The method of claim 8, wherein the threshold number of required matches is greater than 1.

16. A device for achieving synchronization in a wireless communication system, the device comprising:
a network interface for receiving a plurality of transmissions from another wireless communication device, wherein each transmission comprises a plurality of time slots carrying voice or data and a plurality of signaling fields inserted between the time slots, wherein the plurality of signaling fields include a first set of signaling fields of a first information type and a second set of signaling fields of a second information type; and a processor configured to:
detect, via the network interface, at least two consecutive signaling fields of the first information type in at least one of the plurality of received transmissions;

recover at least two signaling fields of the second information type following the detected two consecutive signaling fields of the first information type;

for each one of the at least two recovered signaling fields of the second information type:

predict a plurality of further subsequent signaling fields of the second information type, including at least a third signaling field of the second information type, based on recovered information extracted from the respective one of the at least two recovered signaling fields of the second information type;

responsive to actually receiving some of the plurality of further subsequent signaling fields of the second information type, via the network interface, including at least a third signaling field of the second information type, compare the predicted further subsequent signaling fields of the second information type with the actual received further subsequent signaling fields of the second information type; and achieve synchronization when a number of matches obtained between the actual received further subsequent signaling fields and the corresponding predicted further subsequent signaling fields meets a threshold number of required matches.

17. The device of claim 16, wherein the processor is further configured to detect the at least two consecutive signaling fields of the first information type by:
correlating a predefined synchronization pattern with at least a part of a synchronization pattern contained in one of the two consecutive signaling fields of the first information type to obtain a correlation value;

determining whether the correlation value is greater than a first threshold level;

recovering the synchronization pattern contained in the one of the two consecutive signaling fields of the first information type when the correlation value is greater than the first threshold level;

computing a first bit error count associated with the recovered synchronization pattern;

recovering another synchronization pattern contained in the other of the two consecutive signaling fields of the first information type when the first bit error count is less than a second threshold level;

computing a second bit error count associated with the recovered another synchronization pattern; and confirming the detection of two consecutive signaling fields of the first information type when the second bit error count is less than a third threshold level.

18. The device of claim 16, wherein the processor is further configured to:
recover the third signaling field of the second information type; and predict still further subsequent signaling fields of the second information type based on the recovered third signaling field of the second information type.

19. The device of claim 16, wherein the threshold number of required matches is greater than 1.

* * * * *